US012481930B2

(12) United States Patent
Puglisi et al.

(10) Patent No.: US 12,481,930 B2
(45) Date of Patent: Nov. 25, 2025

(54) SYSTEM AND METHOD FOR DETERMINING AND DISPLAYING QUEUE WAIT TIMES

(71) Applicant: Universal City Studios LLC, Universal City, CA (US)

(72) Inventors: Nicholas Anthony Puglisi, Orlando, FL (US); Garrett Cavin Sutula, Orlando, FL (US); David Gerard Majdali, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 943 days.

(21) Appl. No.: 16/783,904

(22) Filed: Feb. 6, 2020

(65) Prior Publication Data

US 2021/0248519 A1    Aug. 12, 2021

(51) Int. Cl.
*G06Q 10/02* (2012.01)
*A63G 31/00* (2006.01)
(Continued)

(52) U.S. Cl.
CPC ............. *G06Q 10/02* (2013.01); *A63G 31/00* (2013.01); *G06Q 10/06311* (2013.01);
(Continued)

(58) Field of Classification Search
CPC .................................................. G06Q 10/02
See application file for complete search history.

(56) References Cited

U.S. PATENT DOCUMENTS 7,400,932 B2    7/2008   Ackley et al.
8,082,165 B2   12/2011   Natsuyama et al.
(Continued)

FOREIGN PATENT DOCUMENTS

JP    2005189921 A    7/2005
JP    2017502437 A    1/2017
(Continued)

OTHER PUBLICATIONS

Titarmare, Prof N., and Prof A. Yerlekar. "A Survey on Patient Queue Management System." International Journal of Advanced Engineering, Management and Science, vol. 4, No. 4, Apr. 2018. (Year: 2018).*

(Continued)

*Primary Examiner* — Emmett K. Walsh
(74) *Attorney, Agent, or Firm* — Fletcher Yoder, PC (57) ABSTRACT

A queue wait time estimation system includes a processor and a memory having instructions stored thereon. Executing the instructions causes the processor to receive a first input via a first queue monitoring mode, wherein the first input is indicative of a first queue monitoring characteristic of at least one queue, and also causes the processor to receive a second input via a second queue monitoring mode, wherein the second input is indicative of a second queue monitoring characteristic of the at least one queue, and the second queue monitoring mode is different than the first queue monitoring mode. Executing the instructions also causes the processor to determine, based on the first queue monitoring characteristic and the second queue monitoring characteristic, at least one estimated queue wait time corresponding to the at least one queue, and also causes the processor to output the at least one estimated queue wait time.

19 Claims, 5 Drawing Sheets

(51) Int. Cl.
*G06Q 10/0631* (2023.01)
*G06V 40/16* (2022.01)
*H04W 4/80* (2018.01)
*H04W 84/12* (2009.01)
*G01W 1/10* (2006.01)

(52) U.S. Cl.
CPC ............ *G06V 40/161* (2022.01); *H04W 4/80* (2018.02); *H04W 84/12* (2013.01); *G01W 1/10* (2013.01)

(56) References Cited

U.S. PATENT DOCUMENTS

| | | | |
|---|---|---|---|
| 8,200,515 | B2 | 6/2012 | Natsuyama et al. |
| 8,606,605 | B2 | 12/2013 | Bayne et al. |
| 8,635,645 | B2 | 1/2014 | Krishnamoorthi et al. |
| 9,204,257 | B1 | 12/2015 | Mendelson |
| 9,544,744 | B2 | 1/2017 | Postrel |
| 9,671,230 | B2 | 6/2017 | Sahay et al. |
| 2003/0093167 | A1 | 5/2003 | Sim |
| 2004/0224703 | A1 | 11/2004 | Takaki et al. |
| 2006/0200542 | A1* | 9/2006 | Willig ............... H04L 12/10 709/223 |
| 2007/0040652 | A1 | 2/2007 | Quatro |
| 2008/0046304 | A1* | 2/2008 | Dean ............... G06Q 10/00 705/7.27 |
| 2010/0063854 | A1 | 3/2010 | Purvis et al. |
| 2013/0260788 | A1* | 10/2013 | Bonde ............... G07C 11/00 455/456.1 |
| 2015/0019271 | A1 | 1/2015 | Abuelsaad et al. |
| 2016/0321548 | A1 | 11/2016 | Ziskind et al. |
| 2017/0178084 | A1* | 6/2017 | Barreira Avegliano ............... G06Q 10/1097 |
| 2018/0129984 | A1* | 5/2018 | Polk ............... G06Q 10/06311 |
| 2018/0240176 | A1 | 8/2018 | Cronin et al. |
| 2018/0247331 | A1 | 8/2018 | D'Andrea |
| 2019/0327579 | A1* | 10/2019 | Rankin, V ............... H04W 4/80 |

FOREIGN PATENT DOCUMENTS

| | | |
|---|---|---|
| JP | 2018194896 A | 12/2018 |
| WO | 2002001814 | 1/2002 |

OTHER PUBLICATIONS

Wang, Yan, et al. "Tracking human queues using single-point signal monitoring." Proceedings of the 12th annual international conference on Mobile systems, applications, and services. 2014. (Year: 2014).*

PCT/US2021/015842 International Search Report and Written Opinion mailed Apr. 12, 2021.

JP Office Action for Japanese Application No. 2020-062028 mailed Feb. 26, 2024.

* cited by examiner

SYSTEM AND METHOD FOR DETERMINING AND DISPLAYING QUEUE WAIT TIMES

BACKGROUND

Since the early twentieth century, amusement parks (or theme parks) have grown substantially in popularity. Accordingly, there has been an increased demand and an accompanying increase in competition with respect to amusement parks. It is therefore desirable to add more entertaining and interactive attractions to amusement parks. Engaging guests throughout their time at an amusement park is a major priority of amusement park entities. Even though large attractions, like rides and shows, tend to increase traffic at amusement parks, there exists a need to keep guests engaged, fascinated, and intrigued throughout their visit with other attractions that can make their experience all the more memorable. Further, there exists a need to accurately inform guests of amusement park expectations, such as accurately informing guests of estimated wait times for various attractions, to improve the guest experience. Thus, it is recognized that technology for improved queue wait time estimations and display are desirable.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a queue wait time estimation system for an amusement park includes a memory storing instructions and a processor configured to execute the instructions. Executing the instructions causes the processor to receive a first input via a first queue monitoring mode, wherein the first input is indicative of a first queue monitoring characteristic of at least one queue. Executing the instructions also causes the processor to receive a second input via a second queue monitoring mode, wherein the second indicative is of a second queue monitoring characteristic of the at least one queue, and the second queue monitoring mode is different than the first queue monitoring mode. Executing the instructions also causes the processor to determine, based on the first queue monitoring characteristic and the second queue monitoring characteristic, at least one estimated queue wait time corresponding to the at least one queue. Executing the instructions also causes the processor to output, to a display device, the at least one estimated queue wait time.

In an embodiment, a queue wait time estimation system for an amusement park includes a memory storing instructions and a processor configured to execute the instructions. Executing the instructions causes the processor to receive inputs from a wireless personal area network (PAN) monitor, where each input of the inputs is indicative of a continuous wireless PAN connection time of a customer interface device (CID) between a beginning and an end of a queue. Executing the instructions also causes the processor to determine, based on the inputs, an estimated queue wait time corresponding to the queue. Executing the instructions also causes the processor to output, to a display device, the estimated queue wait time.

In an embodiment, a queue wait time estimation system for an amusement park includes a memory storing instructions and a processor configured to execute the instructions. Executing the instructions causes the processor to receive inputs corresponding to a queue monitoring characteristic of a queue, and to determine a subset of inputs of the inputs that exceed a threshold value of the queue monitoring characteristic. Executing the instructions also causes the processor to determine, based on the first subset of inputs, an estimated queue wait time corresponding to the queue, and to output, to a display device, the estimated queue wait time.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Reference will now be made in detail to specific embodiments illustrated in the accompanying drawings and figures. In the following detailed description, numerous specific details are set forth in order to provide a thorough understanding of the disclosure. However, it will be apparent to one of ordinary skill in the art that embodiments may be practiced without these specific details. In other instances, well-known methods, procedures, components, have not been described in detail so as not to unnecessarily obscure aspects of the embodiments.

The terminology used herein is for the purpose of describing particular embodiments only and is not intended to be limiting. As used in the description and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, operations, elements, components, and/or groups thereof.

Further, as used herein, the term "if" may be construed to mean "when" or "upon" or "in response to determining" or "in response to detecting," depending on the context.

Amusement parks are continually growing in popularity, increasing attendance and traffic therein. Thus, queues are employed to organize guests waiting to participate in various attractions at amusement parks. Unexpected queue wait times can detract from a guest experience. Accordingly, there exists a need to accurately inform guests of estimated queue wait times for various attractions. Thus, it is presently recognized that technology for improved queue wait time estimations and display are desirable.

In accordance with the present disclosure, a queue wait time estimation and display system may include a queue controller and one or more queue monitoring modes configured to monitor one or more queue characteristics of one or more queues. The controller may receive data inputs indicative of the queue characteristics from the queue monitoring modes, and determine an estimated queue wait time based on the data inputs. The controller may output estimated queue wait times to various display pipelines or devices. To improve accuracy and reliability of the estimated queue wait times, the controller may select or rely on multiple of the queue monitoring modes or a particular one of the queue monitoring modes for at least one queue, in some embodiments based on an input that suggests relatively improved accuracy or reliability of one or more particular queue monitoring modes and/or corresponding queue monitoring characteristics. Further, presently disclosed types of queue monitoring modes may improve accuracy and reliability of queue wait time estimates. Further still, presently disclosed calculations, which include filtering inaccurate or unreliable data, may improve accuracy and reliability of queue wait time estimates. These and other features are described in detail below with reference to the drawings.

Figure 1:
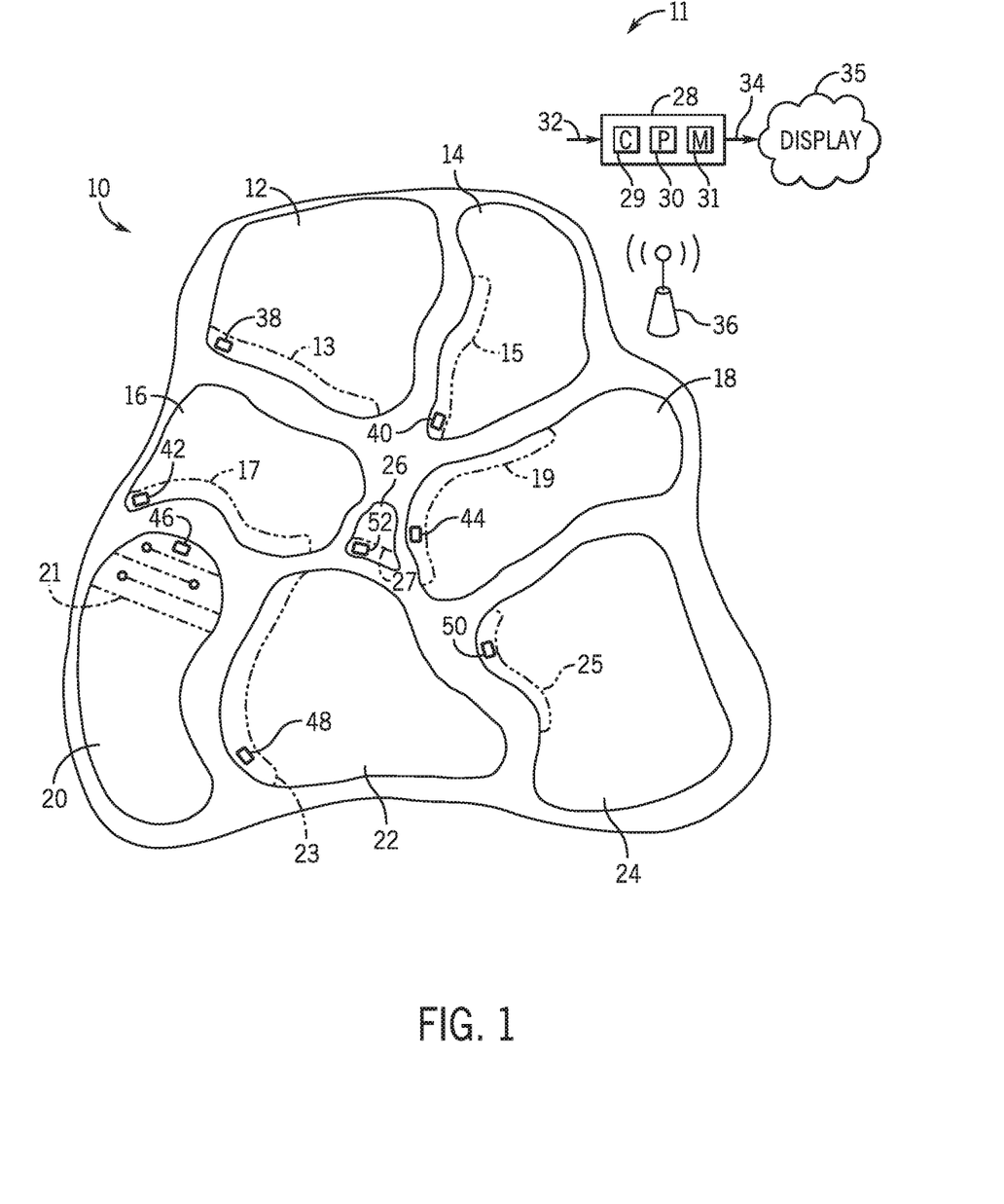
FIG. 1 is an overhead schematic view of an amusement park including amusement park attractions and a queue wait time estimation system, in accordance with an embodiment of the present disclosure.

Turning now to the drawings, FIG. 1 is a top schematic view of an embodiment of an amusement park 10 including amusement park attractions 12, 14, 16, 18, 20, 22, 24, 26 and a queue wait time estimation system 11. The amusement park attractions 12, 14, 16, 18, 20, 22, 24, 26 may include various types of attractions. For example, the amusement park attraction 12 may include a roller coaster, the amusement park attraction 14 may include a water ride, the amusement park attraction 16 may include a show, the amusement park attraction 18 may include a virtual or augmented reality experience, the amusement park attraction 20 may include a drop tower, the amusement park attraction 22 may include a simulator, the amusement park attraction 24 may include a swing, and the amusement park attraction 26 may include a food court or food stand. Other attractions are also possible.

Each amusement park attraction 12, 14, 16, 18, 20, 22, 24, 26 may include a corresponding queue 13, 15, 17, 19, 21, 23, 25, 27. The queues 13, 15, 17, 19, 21, 23, 25, 27 may be arranged to organize a line or lines of guests waiting to participate in the attractions 12, 14, 16, 18, 20, 22, 24, 26. In some embodiments, each queue 13, 15, 17, 19, 21, 23, 25 may be broken into multiple queue segments corresponding to different types of lines. For example, the queue 13 may include a first queue segment dedicated to a single-rider line, a second queue segment dedicated to a regular queue, a third queue segment dedicated to an express queue (e.g., having a shorter wait time enabled by express queue tickets), and a fourth queue segment dedicated to a virtual line (e.g., whereby a guest can wait in a digital queue without physically standing in line, and then physically arrive at the attraction at a prescribed time based on a digital wait time). Other queue options and queue segments are also possible.

A queue wait time estimation system 11 may be employed by the amusement park 10 to monitor the queues 13, 15, 17, 19, 21, 23, 25, 27, estimate queue wait times, and display the estimated queue wait times to various displays 35 (e.g., an customer interface device [CID] such as a mobile phone, an online app, queue-specific displays in the amusement park 10, etc.). The queue wait time estimation system 11 may include, for example, a controller 28 having communication circuitry 29, a processor 30, and a memory 31. The communication circuitry 29 may be employed to communicatively couple the controller 28 with input devices and output devices, such as the displays 35. The memory 31 may store instructions thereon that, when executed by the processor 30, cause the processor 30 to complete certain acts. For example, the instructions, when executed by the processor 30, may be configured to receive various inputs 32, determine estimated queue wait times based on the inputs 32, and communicate outputs 34 (e.g., the estimated queue wait times) to the various displays 35 described above.

The queue wait time estimation system 11 may also include a number of monitoring systems 38, 40, 42, 44, 46, 48, 50, 52 configured to monitor features of the queues 13, 15, 17, 19, 21, 23, 25, 27 of the corresponding attractions 12, 14, 16, 18, 20, 22, 24, 26. Further, the monitoring systems 38, 40, 42, 44, 46, 48, 50, 52 may output data indicative of a queue characteristic (e.g., queue throughput, queue length, actual wait times of various guests, etc.) to the controller 28, which is received as the inputs 32 to the controller 28. It should be noted that the queue characteristics monitored at the amusement park 10 may vary. For example, the queue monitoring system 38 may monitor a queue throughput, the queue monitoring system 40 may monitor a queue length, the queue monitoring system 42 may monitor actual wait times of various guests, and so forth. Further, a particular monitoring system, such as the monitoring system 38 associated with the queue 13 of the attraction 12, may toggle to monitor different monitoring characteristics at a given point in time. For example, the monitoring system 38 may monitor a characteristic indicative of queue rate (e.g., a characteristic indicative of a number of guests passing through an end of the queue 13 per unit of time) during a first time period, and a characteristic indicative of queue length (e.g., a characteristic indicative of a number of guests in the queue 13) during a second time period different than the first time period. Further still, a particular monitor, such as the monitoring system 38, may monitor multiple queue segments of the corresponding queue 13 (e.g., single rider queue segment, regular queue segment, express queue segment, virtual queue segment, and others). The controller 28 may receive the various inputs 32, enter the inputs to a queue wait time estimation algorithm, and communicate estimated queue wait times via the outputs 34 to various displays 35.

Figure 2:
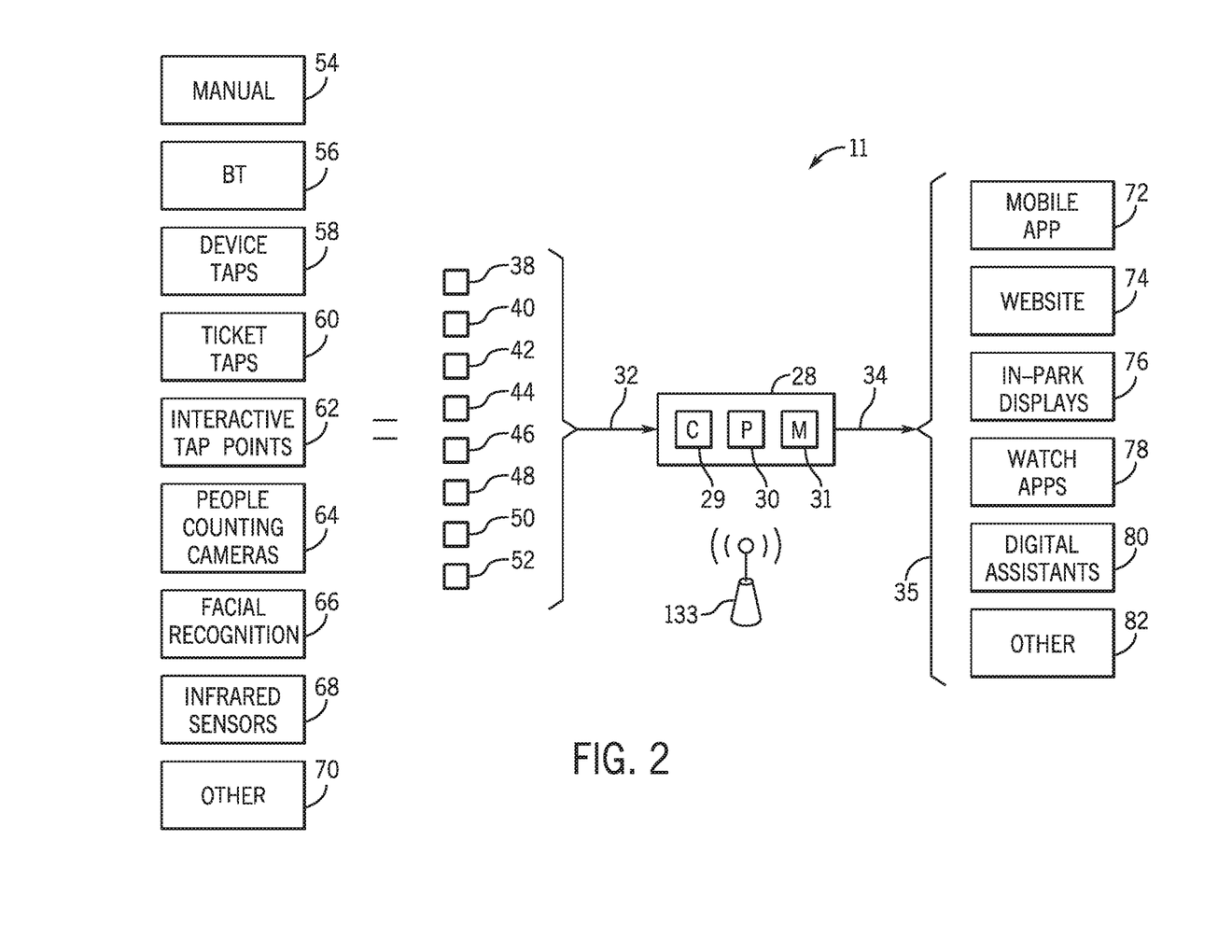
FIG. 2 is a schematic illustration of a queue wait time estimation system configured to receive various queue wait time characteristics and to output queue wait time estimates to various displays, in accordance with an embodiment of the present disclosure.

Further to the points above, different modes of queue monitoring may be employed throughout the amusement park 10. For example, FIG. 2 is a schematic illustration of an embodiment of the queue wait time estimation system 11 for the amusement park 10 of FIG. 1. As previously described, the controller 28 may receive, via the inputs 32, data indicative of queue characteristics (e.g., queue throughput, queue rate, queue length, actual queue wait times, etc.) from the queue monitoring systems 38, 40, 42, 44, 46, 48, 50, 52. In some embodiments, the queue monitoring systems 38, 40, 42, 44, 46, 48, 50, 52 may be wire-connected with the controller 28. In other embodiments, an Internet system 133 may be utilized to transmit data wirelessly from the queue monitoring systems 38, 40, 44, 46, 48, 50, 52 to the controller 28.

After receiving the various inputs 32 of data indicative of queue characteristics, the controller 28 may enter the inputs 32 to one or more algorithms to determine estimated queue wait times of the queues associated with various amusement park attractions. The controller 28 may communicate the estimated queue wait times via the outputs 34 to the various display pipelines 35, which may include, for example, a mobile application 72, a website 74, one or more in-park displays 76, smart watch applications 78, digital assistants 80, and others 82.

The queue monitoring systems 38, 40, 42, 44, 46, 48, 50, 52, which provide the above-described inputs 32 to the controller 28, may employ different modes of monitoring. The mode may be characterized by a manner in which the queue is monitored and/or devices used to monitor the queue.

For example, a manual entry mode 54 may be employed, whereby an operator enters as one of the inputs 32 to the controller 28 data indicative of queue characteristics (e.g., queue throughput, queue rate, queue length, actual wait times of various guests, etc.). The data may be entered to an algorithm employed by the controller 28 to determine estimated queue wait times, which are communicated via the outputs 34 to various display devices 35.

Additionally or alternatively, a wireless personal area network (PAN) mode 56 may be employed. The wireless PAN mode 56 may include, for example, one or more wireless PAN monitors (e.g., Bluetooth connection monitors) that connect to, or monitor wireless PAN (e.g., Bluetooth) connections of, guest devices while the guest is in a queue having the wireless PAN mode 56. For example, the Bluetooth connection monitor(s) may monitor a continuous connection of the guest device during the guest's wait. The continuous connection may be indicative of, for example, an actual wait time of the guest associated with the guest device. In some embodiments, the wireless PAN mode 56 may include Bluetooth monitors that monitor a strength of the Bluetooth connection, and the wait time of the guest is inferred or determined based on the strength exceeding a threshold strength for a given time period. However, it should be noted that other wireless PAN connections other than Bluetooth may also be used.

Additionally or alternatively, a device tap mode 58, ticket tap mode 60, and/or interactive tap point mode 62 may be employed. The device tap mode 58 may include device tap stations at a start and an end of the queue. A guest may tap her customer interface device (CID), such as a mobile phone, at the device tap station at the start of the line and at the end of the line, and the guest's actual wait time may be deduced based on an amount of time between the start tap and the end tap. The ticket tap mode 60 may operate similarly, but may include a ticket tap (e.g., scanning of a bar code, QR code, or the like) at the start and the end of the queue. The interactive tap point mode 62 may operate similarly, but may include an interactive tap scheme whereby the guest interacts with an interactive tap station in a manner that uniquely identifies the guest at a start of the line, end of the line, and any point therebetween.

Additionally or alternatively, a camera-based people counting mode 64 and/or facial recognition mode 66 may be employed. For example, cameras may be employed at a start of the queue, an end of the queue, and anywhere therebetween. The cameras and/or the controller 28 may count a number of guests in the queue, or a number of guests passing through the end or other point of the queue over a period of time. In some embodiments, facial recognition may be employed with the people counting feature, or employed separately. For example, a facial recognition camera may be installed at the start of the queue, and an additional facial recognition camera may be installed at the end of the queue. The facial recognition cameras, or the controller 28, may determine an actual wait time of a particular guest by determining when the particular guest entered the queue and when the particular guest completed the queue.

Additionally or alternatively, a sensor based (e.g., Infrared sensor based) thermal detection mode 68 may be employed. In the thermal detection mode 68, one or more sensors (e.g., Infrared sensors) may detect thermal sources (e.g., people) and/or a thermal distribution of thermal sources indicative of, for example, a queue length. For example, Infrared sensors distributed along the queue may detect a distribution of thermal sources between an end of the queue and a certain point between the end of the queue and the start of the queue. The queue length may be based on the length between the end of the queue and the certain point at which the distribution of thermal sources ends. Additionally or alternatively, other modes 70 of queue monitoring may be employed.

It should be noted that each queue is not necessarily limited to a single mode of the various modes 54, 56, 58, 60, 60, 62, 64, 66, 68, 70. For example, in accordance with the present disclosure, a single queue may include multiple modes, such as the wireless PAN mode 56 and the people counting and/or facial recognition modes 64, 66, of monitoring. In some embodiments, a first mode of monitoring a single queue may be employed at a first point in time, and a second mode of monitoring the single queue may be employed at a second point in time. Additionally or alternatively, the first and second modes of monitoring may be employed in tandem at the same time. Further, as previously described, a single queue may be broken into multiple segments, including but not limited to a single rider segment, a regular queue segment, an express line segment, a virtual line segment, or any combination thereof. Each queue segment may include a dedicated queue monitoring mode, or all the queue segments may include the same queue monitoring mode, or a single queue segment may include multiple queue monitoring modes.

Figure 3:
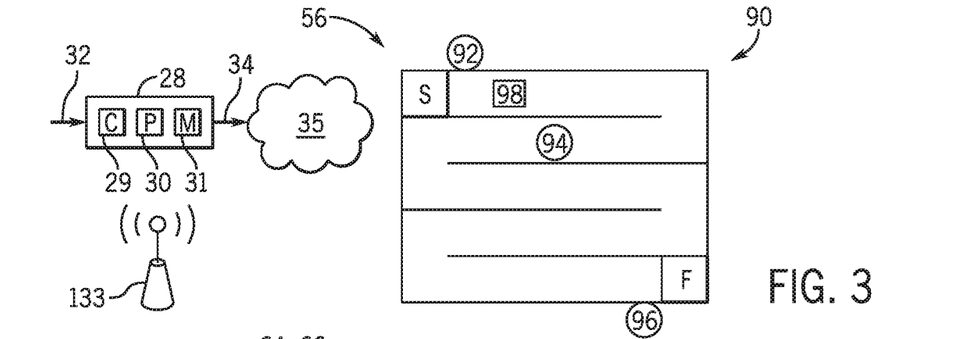
FIG. 3 is an overhead view of a queue with a wireless personal area network (PAN) queue monitoring mode, in accordance with an embodiment of the present disclosure.

FIGS. 3-7 further illustrate the above-described queue monitoring modes. For example, FIG. 3 is an overhead view of an embodiment of a queue 90 monitored by the wireless PAN mode 56. In the wireless PAN mode 56, Bluetooth receivers 92, 94, 96 (or other wireless PAN receivers) may be distributed along the queue 90. In the illustrated embodiment, a first Bluetooth receiver 92 is positioned at a start of the queue 90, a second Bluetooth receiver 94 is positioned at a middle of the queue 90, and a third Bluetooth receiver 96 is positioned at an end or finish of the queue 90. However, any number of receivers may be employed. In some embodiments, only a single Bluetooth receiver is employed. The one or more Bluetooth receivers 92, 94, 96 may be configured to connect to a customer interface device (CID) 98, such as a mobile phone having Bluetooth capabilities. The connection may be monitored continuously while the guest and corresponding CID 98 are in the queue. It should be noted that other wireless PAN componentry may be used (e.g., other than Bluetooth componentry).

A connection duration may be communicated by one or more of the Bluetooth receivers 92, 94, 96 as one of the inputs 32 to the controller 28. In some embodiments, a combined connection duration detected by all the Bluetooth receivers 92, 94, 96 may be communicated as one of the inputs 32 to the controller 28 (e.g., accounting for any connection overlap between individual connection durations detected by the Bluetooth receivers 92, 94, 96). The connection duration may be measured as an amount of time during which the Bluetooth connection exceeds a threshold connection strength. Further, connection durations at various regions within the queue 90 may be individually monitored to determine blockages or stoppages in the queue 90, unexpected wait times (e.g., fast wait times), and other features that may be utilized to determine whether any data is bad data and should not be used to calculate the estimated queue wait time. The controller 28 may calculate the estimated queue wait time based on the input(s) 32, and communicate as the output 34 the estimated queue wait time to various display pipelines or devices 35 (e.g., displays).

Figure 4:
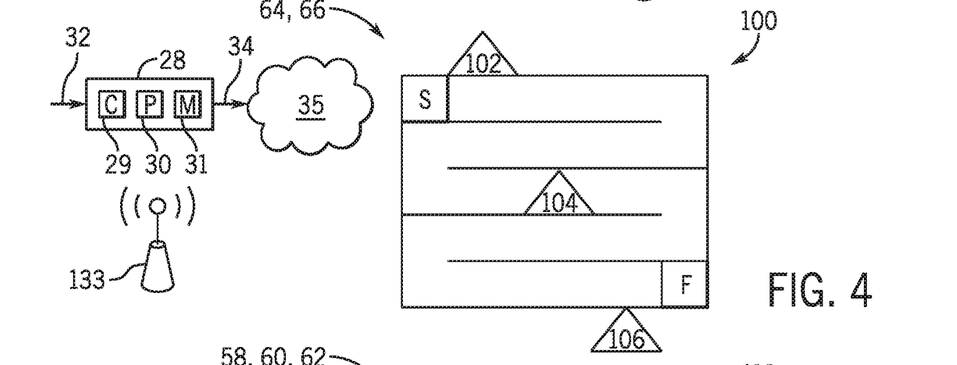
FIG. 4 is an overhead view of a queue with a camera-based people counting and/or facial recognition monitoring mode, in accordance with an embodiment of the present disclosure.

FIG. 4 is an overhead view of an embodiment of a queue 100 monitored by the camera-based people counting and/or facial recognition mode(s) 64, 66. In the camera-based people counting and/or facial recognition mode 64, 66, cameras 102, 104, 106 may be distributed along the queue 100. In the illustrated embodiment, a first camera 102 is positioned at a start of the queue 100, a second camera 104 is positioned at a middle of the queue 100, and a third camera 106 is positioned at an end or finish of the queue 100. However, any number of cameras may be employed. In some embodiments, only one camera is employed. The cameras 102, 104, 106 may be configured to record the queue 100 as guests wait in and pass through the queue 100. In some embodiments, one or more of the cameras 102, 104, 106 may include, or the controller 28 may include, facial recognition software. The facial recognition software may be utilized to identify a guest at least at a start and end or finish of the queue 100. The duration corresponding to the guest's wait between the start and the finish may be received as one of the inputs 32, or determined by the controller 28 based on the input(s) 32 received from one or more of the cameras 102, 104, 106 or an intervening device. If the people counting mode 64 is employed, data from one or more of the cameras 102, 104, 106 may be utilized to determine a number of guests in the queue 100, for example at a given point in time, which may be used to infer or determine a queue length. The input(s) 32 to the controller 28 are utilized to calculate an estimated queue wait time, which is communicated to the various displays 35 via the output(s) 34.

Figure 5:
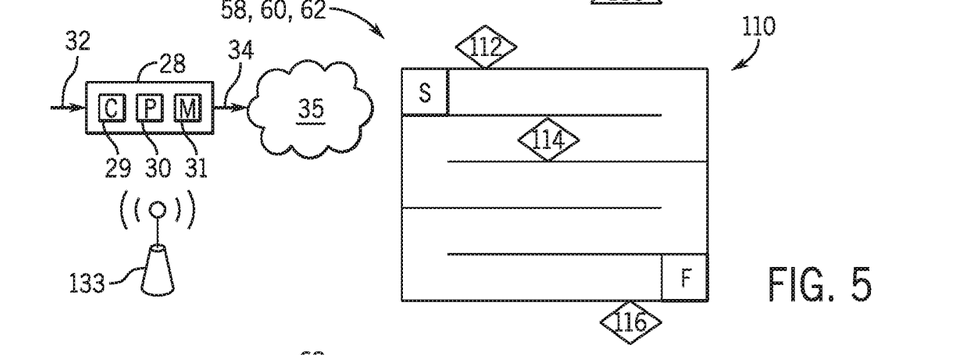
FIG. 5 is an overhead view of a queue with a device, ticket, and/or interactive tap point monitoring mode, in accordance with an embodiment of the present disclosure.

FIG. 5 is an overhead view of an embodiment of a queue 110 monitored by the device, ticket, and/or interactive tap point mode(s) 58, 60, 62. In each of these modes 58, 60, 62, tap stations 112, 114, 116 may be distributed about the queue 110. Any number of tap stations 112, 114, 116 may be employed. The tap stations 112, 114, 116 may be utilized to receive taps from a device (e.g., customer interface device [CID], such as a mobile phone), a ticket (e.g., by scanning a bar or QR code), or the guests themselves. In the interactive tap point mode 62, the guest may interact with the various tap stations 112, 114, 116 in a manner that uniquely identifies the guest (e.g., by entering a code or name associated with the guest). Additionally or alternatively, in the interactive tap point mode 62, a total number of volume of guest taps may be utilized to infer a queue characteristic. The controller 28 receives, as one of the inputs 32, tap data indicative of the queue characteristic(s), and based on the tap data, determines and communicates via the output(s) 34 an estimated queue wait time to various display pipelines or devices 35.

Figure 6:
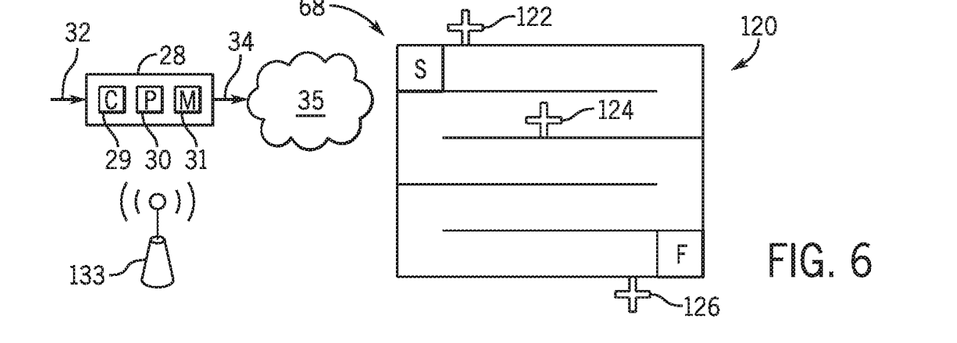
FIG. 6 is an overhead view of a queue with a thermal monitoring mode, in accordance with an embodiment of the present disclosure.

FIG. 6 is an overhead view of an embodiment of a queue 120 monitored by the sensor based thermal monitoring mode 68. In the sensor based thermal monitoring mode 68, sensors 122, 124, 126 may be distributed along the queue 120. In the illustrated embodiment, a first sensor 122 is positioned at a start of the queue 120, a second sensor 124 is positioned at a middle of the queue 120, and a third sensor 126 is positioned at an end or finish of the queue 120. However, any number of sensors may be employed. In some embodiments, only one sensor is employed. The sensors 122, 124, 16 may be, for example, Infrared sensors. In general, the sensors 122, 124, 126 may be configured to detect thermal sources or a thermal distribution of thermal sources. The controller 28 may receive, as one of the inputs 32, data indicative of the thermal sources or thermal distribution of thermal sources. A queue length may be determined or inferred based on the data indicative of the thermal sources or thermal distribution of sources. For example, a queue length may be determined based on the length between the end or finish of the queue and a point at which the thermal sources or distribution of thermal sources ends. The controller 28 may calculate an estimated queue wait time based on the inputs 32 received from one or more of the sensors 122, 124, 126, and output the estimated queue wait time to the various display pipelines or devices 35.

Figure 7:
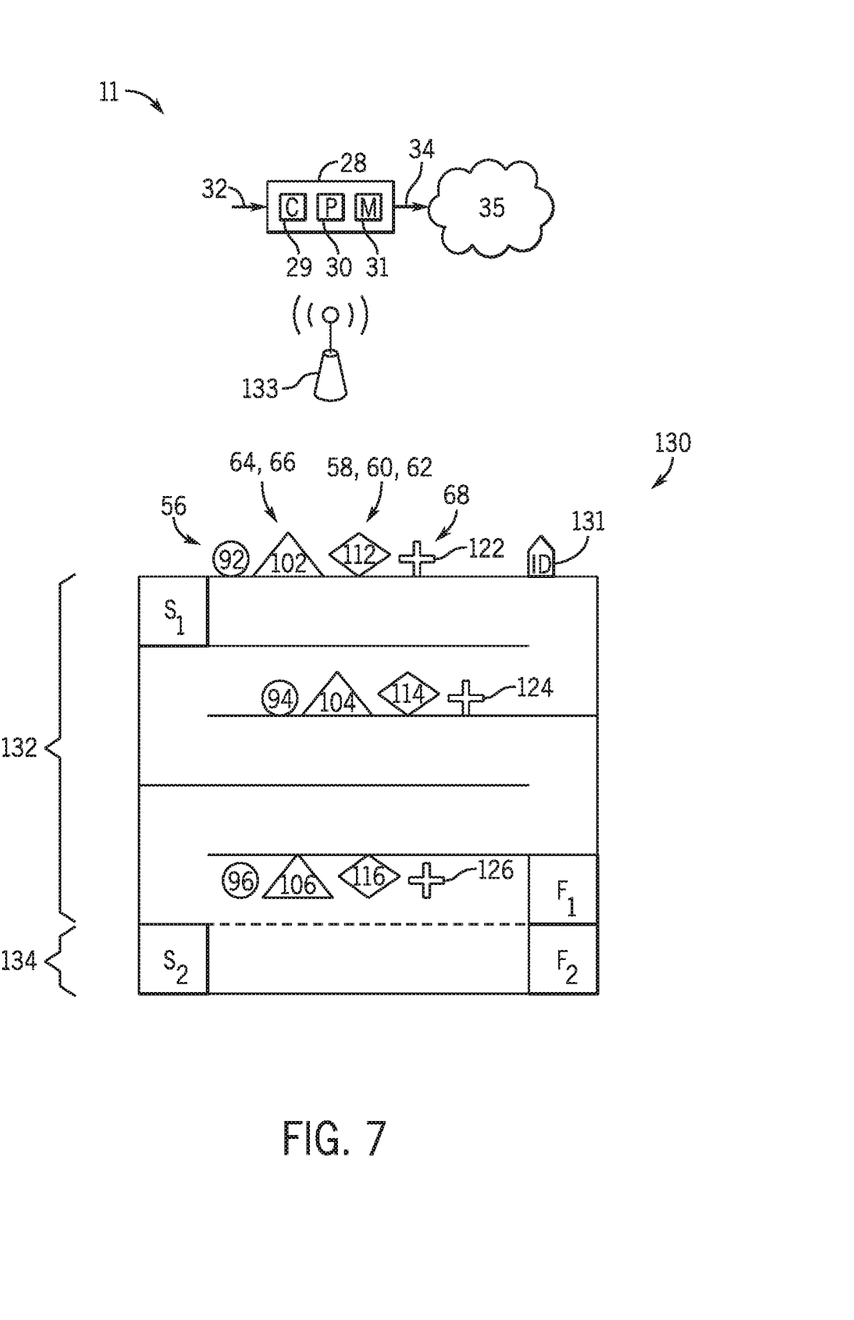
FIG. 7 is an overhead view of a queue with multiple monitoring modes, in accordance with an embodiment of the present disclosure.

As previously noted, multiple queue monitoring modes may be employed on a single queue. For example, FIG. 7 is an overhead view of an embodiment of a queue 130 monitored by multiple monitoring modes (e.g., the wireless PAN mode 56, the camera based people counting and/or facial recognition modes 64, 66, the device, ticket, and/or interactive tap point modes 58, 60, 62, the sensor based thermal detection mode 68, or any combination thereof. As shown, componentry of each mode 56, 58, 60, 62, 64, 66, 68 may be distributed about the queue 130 (e.g., Bluetooth or other wireless PAN receivers 92, 94, 96, cameras 102, 104, 106, tap stations 112, 114, 116, and/or thermal detection sensors 122, 124, 126. In some embodiments, all or multiple of the modes 56, 58, 60, 62, 64, 66, 68 may be employed in tandem, and the controller 28 may determine an estimated queue wait time of the queue 130 based on data received as the inputs 32 for all or multiple of the modes 56, 58, 60, 62, 64, 66, 68. In other embodiments, the controller 28 may select which of the modes 56, 58, 60, 62, 64, 66, 68 is employed at a given time. For example, the controller 28 may receive, as one of the inputs 32, data that is used to determine which of the modes 56, 58, 60, 62, 64, 66, 68 to use. The data may include, for example, a type of attraction associated with the queue 130, weather related data, data indicative of a blockage or stoppage of the queue, data indicative of a shutdown or failure of one or more of the modes 56, 58, 60, 62, 64, 66, 68, etc.

In some embodiments, a mode selection input device 131 may be employed to provide the data to the controller 28 utilized by the controller 28 to select or toggle between the one or more modes 56, 58, 60, 62, 64, 66, 68. For example, the mode selection input device 131 may be a manually operated interface, a weather sensor (e.g., humidity sensor, sunlight or cloud cover sensor, etc.), a power sensor configured to detect an outage of one of the modes 56, 58, 60, 62, 64, 66, 68, or some other input device). In some embodiments, the mode selection input device 131 may be employed to explicitly select one or more of the modes 56, 58, 60, 62, 65, 66, 68, and/or may be incorporated as part of the controller 28. The above-described selection or toggling features may improve the queue wait time estimation system 11. For example, the ability to select or toggle between various ones of the modes 56, 58, 60, 62, 64, 66, 68 may improve accuracy of the estimated wait time calculated by the controller 28, and/or may provide redundancy against failure of one of the modes 56, 58, 60, 62, 64, 66, 68 due to, for example, mechanical or electrical failure, weather-related failure, etc.

It should also be noted that the queue 130 may be separated into multiple queue segments, and that an estimated queue wait time may be determined by the controller 28 for each queue segment. For example, in the illustrated embodiment, the queue 130 includes a regular queue segment 132 and an express queue segment 134. Other types of queue segments may include a single rider segment, a virtual line segment, a family line segment, etc. Each segment 132, 134 may be monitored by the same one or ones of the modes 56, 58, 60, 62, 64, 66, 68, or the segment 132, 134 may be monitored by different modes 56, 58, 60, 62, 64, 66, 68. Indeed, certain segments may be more readily monitored by a particular mode and/or by monitoring a particular queue characteristic (e.g., queue throughput, queue length, queue rate, actual wait time, etc.). For example, a shorter segment (e.g., the express queue segment 134) may be more readily and/or accurately monitored by the wireless PAN mode 56, whereas a longer segment (e.g., the regular queue segment 132) may be more readily monitored by the thermal detection mode 68. As previously suggested, mode toggling by the controller 28 may also be employed with respect to each of the queue segments 132, 134.

Figure 8:
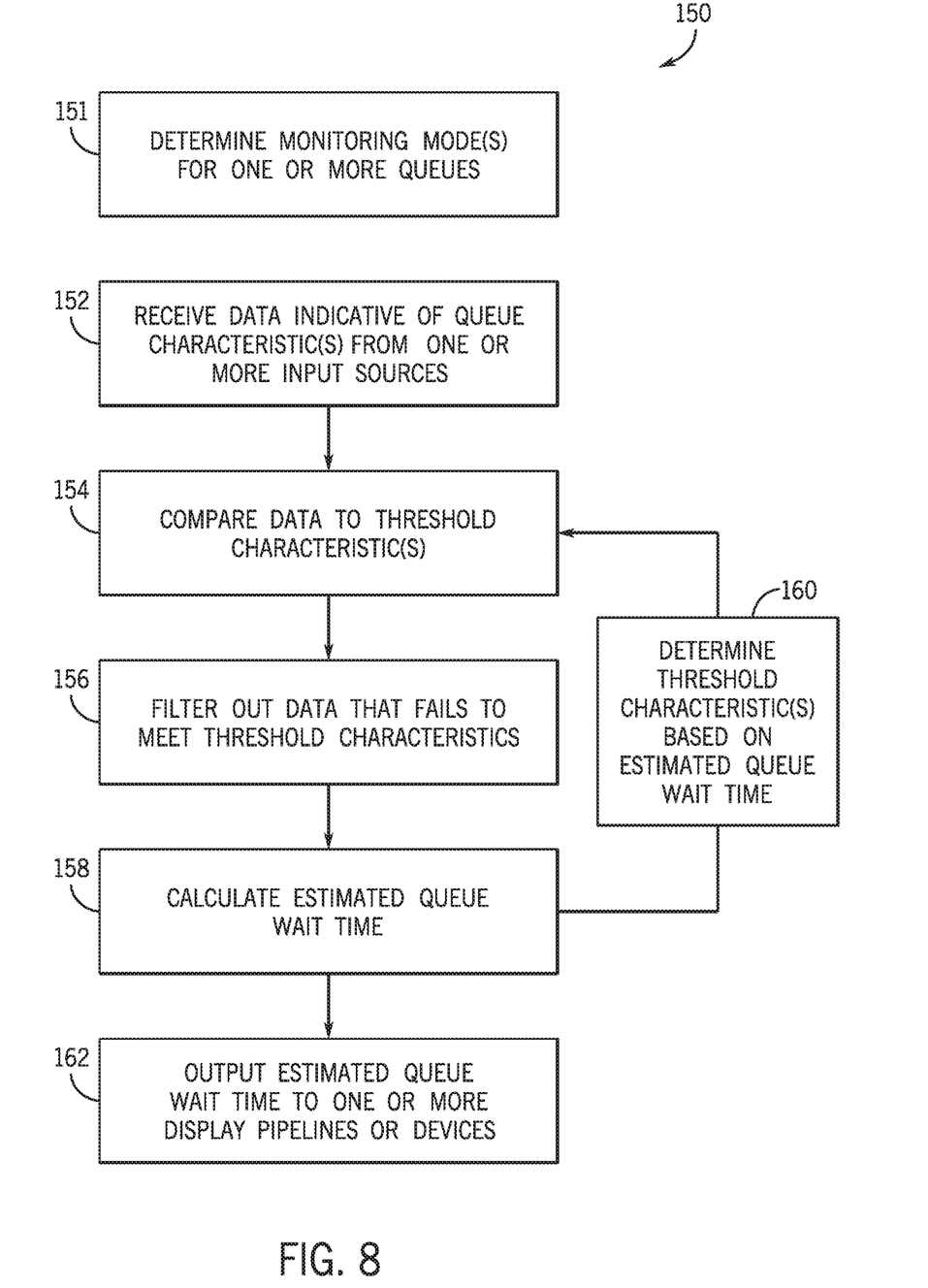
FIG. 8 is a process flow diagram illustrating a method of determining and displaying a queue wait time estimate, in accordance with an embodiment of the present disclosure.

FIG. 8 is a process flow diagram illustrating an embodiment of a method 150 of determining and displaying a queue wait time estimate. The method 150 includes determining (block 151) monitoring modes for one or more queues or queue segments. Available monitoring modes may include, for example, wireless PAN monitoring, device, ticket, or interactive tap point monitoring, camera based people counting and/or facial recognition monitoring, thermal detection monitoring, manual input monitoring, or other types of monitoring. As previously described, one or multiple monitoring modes may be employed for a given queue or segment of queue. In certain embodiments, the monitoring modes employed at a given point in time, or period of time, may be selected based on input data, such as data indicative of a weather event, a type of ride, an outage of one of the available modes, etc.

The method 150 also includes receiving (block 152) data indicative of queue characteristics from one or more input sources (e.g., queue monitoring systems corresponding to the selected queue monitoring modes). For example, as previously described, the data may be indicative of a queue throughput, a queue rate, a queue length, or actual wait times of various guests waiting in the queue.

The method 150 also includes comparing (block 154) the data indicative of queue characteristics to threshold characteristics. For example, the queue characteristic may be an actual wait time experienced by a guest. The actual wait time experienced by the guest may be compared to a percentage of a previously determined queue wait time estimate. That is, the method 150 may include determining whether the actual wait time experienced by the guest exceeds 75%, 80%, 85%, 90%, or some other percentage of the previously determined queue wait time. Indeed, in certain queues, a guest may cut in line or otherwise bypass a portion of a queue, where the cut or bypass is not generally available to most guests. The method 150 may include filtering out (block 156) data that fails to meet the threshold characteristics. That is, the method 150 may include filtering out data that corresponds to abnormal situations in which a guest cuts or bypasses a portion or the queue.

The method 150 also includes calculating (block 158) an estimated queue wait time based on the data (e.g., that meets the threshold characteristics). For example, the method 150 may include entering the data to an algorithm that estimates a queue wait time based on the data. In one embodiment, the algorithm may receive data indicative of a queue length, and may include corresponding estimated queue wait times for various queue lengths or ranges of queue lengths. Additionally or alternatively, the algorithm may receive data indicative of a queue rate or queue throughput, and may include corresponding estimated queue wait times for various rates or queue throughputs. Additionally or alternatively, the algorithm may receive data indicative of actual wait times experienced by various guests, and may calculate a mean (e.g., average), or median, or some other value, that is used as the estimated queue wait time. It should be noted that multiple of the schemes above may be employed. For example, in some embodiments, multiple of the above-described calculations may be executed, and the method 150 may include selecting one of the calculations and/or taking a weighted average of the calculations as the estimated queue wait time.

Once the estimated queue wait time is determined, the estimated queue wait time may be used to determine (block 160) threshold characteristics used in block 154. Further, the method 150 includes outputting (block 162) estimated queue wait times to one or more display pipelines or devices, as previously described. The estimated queue wait times may be output to, for example, a mobile app, a website, in-park displays, smart watch applications, digital assistants, or other display pipelines or devices.

Presently disclosed queue monitoring features and queue wait time display features may improve accuracy and reliability of queue wait time estimates. More accurate and reliable queue wait time estimates may improve a guest experience due to improved guest expectations.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A queue wait time estimation and output system for an amusement park, the queue wait time estimation and output system comprising:
   a memory storing instructions;
   a processor;
   a first queue monitoring device corresponding to a first queue monitoring mode of a plurality of queue monitoring modes, wherein the first queue monitoring device comprises at least a wireless personal area network (PAN) sensor, a camera, a device tap sensor, a ticket tap sensor, an interactive tap device, or an infrared sensor; and
   a second queue monitoring device corresponding to a second queue monitoring mode of the plurality of queue monitoring modes, wherein the processor is configured to execute the instructions to cause the processor to:
      receive, via a queue monitoring mode input sensor, a queue monitoring mode input indicative of an accuracy or reliability of one or more queue monitoring modes of the plurality of queue monitoring modes;
      select, based on the queue monitoring mode input, the first queue monitoring mode from the plurality of queue monitoring modes;
      receive, after selecting the first queue monitoring mode based on the queue monitoring mode input, a first input via the first queue monitoring mode, wherein the first input is indicative of a first queue monitoring characteristic of at least one queue;
      receive a second input via the second queue monitoring mode of the plurality of queue monitoring modes, wherein the second input is indicative of a second queue monitoring characteristic of the at least one queue, and the second queue monitoring mode is different than the first queue monitoring mode;
      determine, in response to the first input indicative of the first queue monitoring characteristic and the second input indicative of the second queue monitoring characteristic, at least one estimated queue wait time corresponding to the at least one queue; and
      output, to a display device, the at least one estimated queue wait time.

2. The queue wait time estimation and output system of claim 1, wherein the first queue monitoring characteristic and the second queue monitoring characteristic correspond to only one queue.

3. The queue wait time estimation and output system of claim 1, wherein the first queue monitoring characteristic corresponds to a first queue of the at least one queue and the second queue monitoring characteristic corresponds to a second queue of the at least one queue.

4. The queue wait time estimation and output system of claim 1, wherein the processor is configured to execute the instructions to cause the processor to:
   receive a plurality of data points corresponding to the first input and the second input;
   compare the plurality of data points to a data threshold;
   determine a first subset of data points of the plurality of data points that fail to meet the data threshold and a second subset of data points of the plurality of data points that meet the data threshold;
   filter out the first subset of data points of the plurality of data points that fail to meet the data threshold; and
   determine the at least one estimated queue wait time corresponding to the at least one queue based on the second subset of data points.

5. The queue wait time estimation and output system of claim 4, wherein the data threshold comprises a percentage of a previously determined queue wait time estimate.

6. The queue wait time estimation and output system of claim 1, wherein the first queue monitoring mode comprises a wireless personal area network (PAN) mode corresponding to the wireless PAN sensor, and the second queue monitoring mode comprises a camera mode.

7. The queue wait time estimation and output system of claim 6, wherein the camera mode comprises at least a people counting camera mode or a facial recognition camera mode.

8. The queue wait time estimation and output system of claim 1, wherein the first queue monitoring mode comprises a device tap mode corresponding to the device tap sensor, a ticket tap mode corresponding to the ticket tap sensor, an interactive tap mode corresponding to the interactive tap device, or any combination thereof.

9. The queue wait time estimation and output system of claim 1, wherein the first queue monitoring mode comprises an infrared sensor mode corresponding to the infrared sensor.

10. The queue wait time estimation and output system of claim 1, comprising at least one Bluetooth sensor corresponding to the first queue monitoring mode, wherein the at least one Bluetooth sensor is configured to continuously monitor a Bluetooth connection between the at least one Bluetooth sensor and a customer interface device (CID) of a guest in the at least one queue.

11. The queue wait time estimation and output system of claim 1, wherein the processor is configured to execute the instructions to cause the processor to select the first queue monitoring mode from the plurality of queue monitoring modes based on:
    at least one additional queue monitoring mode input corresponding to at least a queue type or attraction type.

12. A queue wait time estimation and output system for an amusement park, the queue wait time estimation and output system comprising:
    a memory storing instructions; and
    a processor configured to execute the instructions to cause the processor to:
       receive, from at least one queue monitoring mode input sensor, at least one queue monitoring mode input indicative of an accuracy or reliability of one or more queue monitors, wherein the at least one queue monitoring mode input sensor comprises:
          a power sensor configured to detect an outage of the one or more queue monitors; or
          a weather sensor configured to detect a weather-related characteristic associated with the at least one queue monitoring mode input indicative of the accuracy or reliability of the one or more queue monitors;
       select, in response to the at least one queue monitoring mode input, a wireless personal area network (PAN) monitor of the one or more queue monitors;
       receive, after selecting the wireless PAN monitor, a plurality of inputs from the wireless PAN monitor, wherein each input of the plurality of inputs is indicative of a wireless PAN connection time of a respective customer interface device (CID) between a beginning and an end of a queue;
       determine, in response to the plurality of inputs, an estimated queue wait time corresponding to the queue; and output, to a display device, the estimated queue wait time.

13. The queue wait time estimation and output system of claim 12, wherein the processor is configured to execute the instructions to cause the processor to:
receive a plurality of additional inputs from a monitor having a mode type different than the wireless PAN monitor, wherein each additional input of the plurality of additional inputs is indicative of a queue monitoring characteristic of the queue; and
determine, in response to the plurality of inputs and the additional plurality of inputs, the estimated queue wait time corresponding to the queue.

14. The queue wait time estimation and output system of claim 12, wherein the processor is configured to execute the instructions to cause the processor to:
determine a need to calculate an additional estimated queue wait time in lieu of the estimated queue wait time;
receive a plurality of additional inputs from a monitor having a mode type different than the wireless PAN monitor, wherein each additional input of the plurality of additional inputs is indicative of a queue monitoring characteristic of the queue;
determine, in response to the additional plurality of inputs, the additional estimated queue wait time corresponding to the queue; and
output, to the display device, the additional estimated queue wait time.

15. A queue wait time estimation and output system for an amusement park, the queue wait time estimation and output system comprising:
a memory storing instructions; and
a processor configured to execute the instructions to cause the processor to:
receive, via a queue monitoring mode input sensor, a queue monitoring mode input indicative of an accuracy or reliability of one or more queue monitoring modes of a plurality of queue monitoring modes, wherein the queue monitoring mode input sensor comprises:
a power sensor configured to detect an outage of the one or more queue monitoring modes of the plurality of queue monitoring modes; or
a weather sensor configured to detect a weather-related characteristic associated with the queue monitoring mode input indicative of the accuracy or reliability of the one or more queue monitoring modes of a plurality of queue monitoring modes;
select, in response to receiving the queue monitoring mode input, a queue monitoring mode from the plurality of queue monitoring modes;
receive, from the queue monitoring mode, a plurality of inputs corresponding to a queue monitoring characteristic of a queue;
determine a subset of inputs of the plurality of inputs that exceed a threshold value of the queue monitoring characteristic;
determine, based on the subset of inputs, an estimated queue wait time corresponding to the queue; and
output, to a display device, the estimated queue wait time.

16. The queue wait time estimation and output system of claim 15, wherein the queue monitoring characteristic corresponds to an actual wait time, each input of the plurality of inputs corresponds to the actual wait time of a guest, and the threshold value comprises a percentage of a previously determined queue wait time estimate.

17. The queue wait time estimation and output system of claim 1, wherein the queue monitoring mode input sensor comprises:
a power sensor configured to detect an outage of the one or more queue monitoring modes of the plurality of queue monitoring modes; or
a weather sensor configured to detect a weather-related characteristic associated with the queue monitoring mode input indicative of the accuracy or reliability of the one or more queue monitoring modes of the plurality of queue monitoring modes.

18. A queue wait time estimation and output system for an amusement park, the queue wait time estimation and output system comprising:
a memory storing instructions;
a processor; and
at least one Bluetooth sensor corresponding to a first queue monitoring mode of a plurality of queue monitoring modes, wherein the at least one Bluetooth sensor is configured to continuously monitor a Bluetooth connection between the at least one Bluetooth sensor and a customer interface device (CID) of a guest in the at least one queue, and wherein the processor is configured to execute the instructions to cause the processor to:
receive, via a queue monitoring mode input sensor, a queue monitoring mode input indicative of an accuracy or reliability of one or more queue monitoring modes of the plurality of queue monitoring modes;
select, based on the queue monitoring mode input, the first queue monitoring mode from the plurality of queue monitoring modes;
receive, after selecting the first queue monitoring mode based on the queue monitoring mode input, a first input via the first queue monitoring mode, wherein the first input is indicative of a first queue monitoring characteristic of at least one queue;
receive a second input via a second queue monitoring mode of the plurality of queue monitoring modes, wherein the second input is indicative of a second queue monitoring characteristic of the at least one queue, and the second queue monitoring mode is different than the first queue monitoring mode;
determine, in response to the first input indicative of the first queue monitoring characteristic and the second input indicative of the second queue monitoring characteristic, at least one estimated queue wait time corresponding to the at least one queue; and
output, to a display device, the at least one estimated queue wait time.

19. A queue wait time estimation and output system for an amusement park, the queue wait time estimation and output system comprising:
a memory storing instructions; and
a processor configured to execute the instructions to cause the processor to:
receive, via a queue monitoring mode input sensor, a queue monitoring mode input indicative of an accuracy or reliability of one or more queue monitoring modes of a plurality of queue monitoring modes, wherein the queue monitoring mode input sensor comprises:
a power sensor configured to detect an outage of the one or more queue monitoring modes of the plurality of queue monitoring modes; or a weather sensor configured to detect a weather-related characteristic associated with the queue monitoring mode input indicative of the accuracy or reliability of the one or more queue monitoring modes of the plurality of queue monitoring modes;

select, based on the queue monitoring mode input, a first queue monitoring mode from the plurality of queue monitoring modes;

receive, after selecting the first queue monitoring mode based on the queue monitoring mode input, a first input via the first queue monitoring mode, wherein the first input is indicative of a first queue monitoring characteristic of at least one queue;

receive a second input via a second queue monitoring mode of the plurality of queue monitoring modes, wherein the second input is indicative of a second queue monitoring characteristic of the at least one queue, and the second queue monitoring mode is different than the first queue monitoring mode;

determine, in response to the first input indicative of the first queue monitoring characteristic and the second input indicative of the second queue monitoring characteristic, at least one estimated queue wait time corresponding to the at least one queue; and output, to a display device, the at least one estimated queue wait time.

\* \* \* \* \*